US009070236B1

(12) United States Patent
DiEsposti

(10) Patent No.: US 9,070,236 B1
(45) Date of Patent: Jun. 30, 2015

(54) METHOD AND ARTICLES OF MANUFACTURE FOR TIME-SPACE-POSITION-INFORMATION (TSPI)

(71) Applicant: The United States of America as Represented by the Secretary of the Navy, Washington, DC (US)

(72) Inventor: Raymond S. DiEsposti, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/093,322

(22) Filed: Nov. 29, 2013

Related U.S. Application Data

(63) Continuation-in-part of application No. 14/069,992, filed on Nov. 1, 2013.

(60) Provisional application No. 61/757,370, filed on Jan. 28, 2013.

(51) Int. Cl.
G07C 5/00 (2006.01)
G07C 5/08 (2006.01)

(52) U.S. Cl.
CPC .................................. *G07C 5/0808* (2013.01)

(58) Field of Classification Search
CPC ...... G07C 5/008; G07C 5/0808; G07C 5/085; G07C 2205/02; G06Q 10/06
USPC .............. 701/13, 31.5, 47, 53, 408, 468–469, 701/531, 534; 342/357.395, 357.42, 357.2, 342/357.64
See application file for complete search history.

(56) References Cited

U.S. PATENT DOCUMENTS

| 7,579,986 | B2 | 8/2009 | DiEsposti |
| 7,619,559 | B2 | 11/2009 | DiEsposti |
| 7,688,261 | B2 | 3/2010 | DiEsposti |
| 7,706,976 | B1 * | 4/2010 | Peake ........................... 701/512 |
| 2005/0090978 | A1 * | 4/2005 | Bathory et al. ............... 701/213 |
| 2007/0040744 | A1 * | 2/2007 | Zimmerman et al. ......... 342/464 |
| 2007/0265790 | A1 * | 11/2007 | Sealing et al. .................. 702/33 |
| 2008/0133126 | A1 * | 6/2008 | Dupray ......................... 701/204 |
| 2008/0180318 | A1 * | 7/2008 | Glennon et al. ......... 342/357.06 |
| 2009/0070841 | A1 * | 3/2009 | Buga et al. ..................... 725/116 |
| 2010/0096491 | A1 * | 4/2010 | Whitelaw et al. ............... 244/15 |

(Continued)

*Primary Examiner* — Mary Cheung
*Assistant Examiner* — Atul Trivedi
(74) *Attorney, Agent, or Firm* — James M. Saunders

(57) ABSTRACT

A method for time-space-position-information (TSPI) for at least one air-based platform in a flight test includes providing a system having components to collect TSPI. The system, which includes an air-based platform, is initialized and a flight test is started. The system is remotely monitored to determine system diagnostics and, when system problems are diagnosed, they are fixed by remote configuration or manual repair. TSPI data is received with ground-based receiver nodes through a wireless data link signal transmitted from a dedicated on board transmitter on the air-based platform. The dedicated on board transmitter uses a known transmitter signal waveform. The ground-based receiver nodes match an internally generated signal waveform to the known transmitter signal waveform to measure time of arrival. The TSPI data is collected and sent to a ground processing station. The TSPI data is processed with the ground processing station. The system components and TSPI data are collected. The TSPI data is produced as output.

19 Claims, 3 Drawing Sheets

(56) References Cited

U.S. PATENT DOCUMENTS

| | | | |
|---|---|---|---|
| 2010/0097208 A1* | 4/2010 | Rosing et al. | 340/539.13 |
| 2011/0054721 A1* | 3/2011 | Goodrich et al. | 701/14 |
| 2011/0238307 A1* | 9/2011 | Psiaki et al. | 701/213 |

* cited by examiner

METHOD AND ARTICLES OF MANUFACTURE FOR TIME-SPACE-POSITION-INFORMATION (TSPI)

CROSS-REFERENCE TO RELATED APPLICATIONS

This is a continuation-in-part application, claiming the benefit of parent provisional application No. 61/757,370 filed on Jan. 28, 2013 and parent non-provisional application Ser. No. 14/069,992 filed on Nov. 1, 2013, whereby the entire disclosures of which are incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to advanced range instrumentation technology systems and, more particularly, to a new system and method for providing precise time-space-position-information (TSPI).

Figure 1:
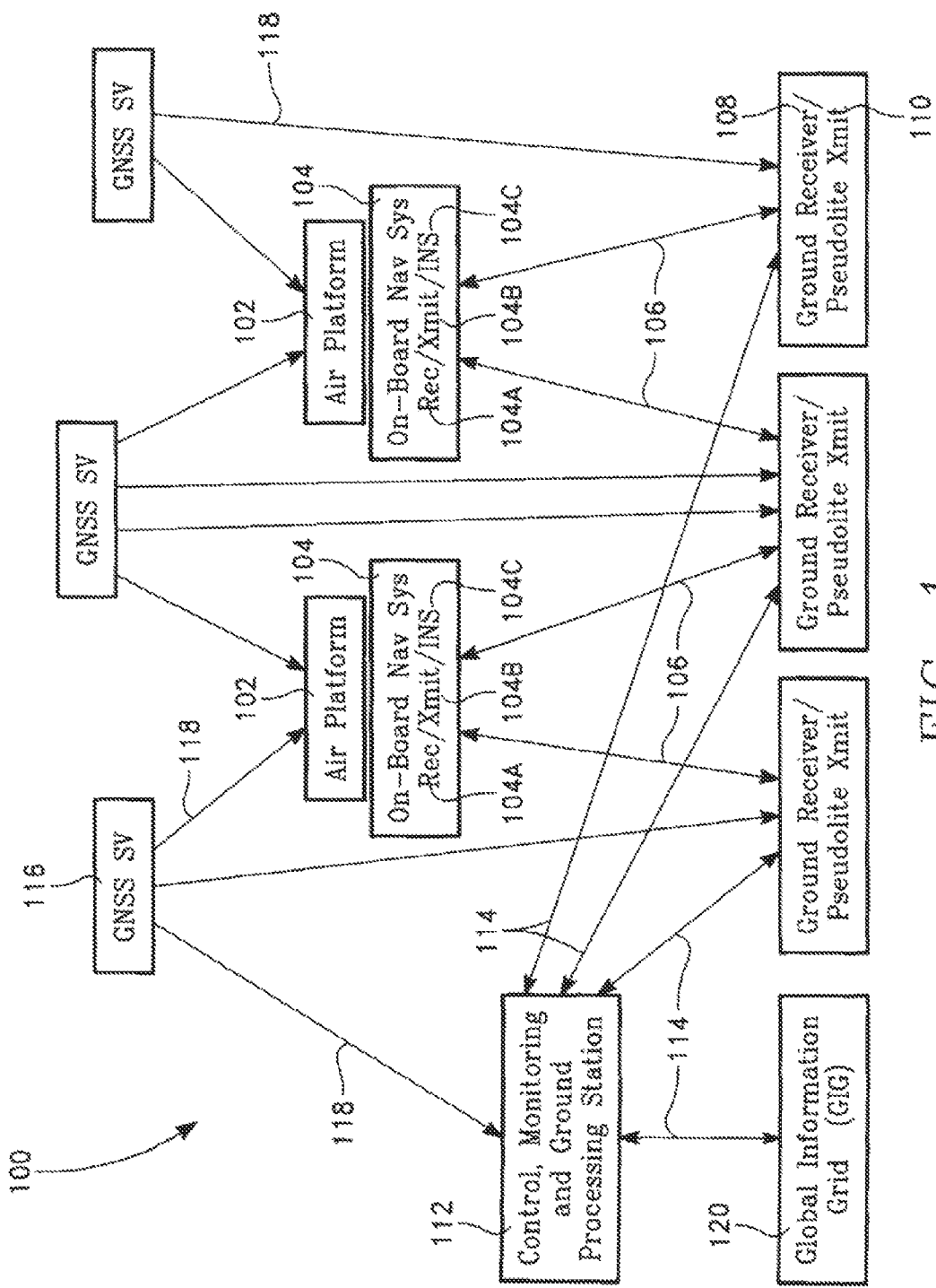
FIG. 1 illustrates a system and its operational components for providing time-space-information, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to a new system and method for providing precise time-space-position-information (TSPI). Embodiments of the invention provide the Navy with a novel approach for TSPI in several areas including, but not limited to, global positioning systems (GPS) denied environments, highly dynamic aircraft, Unmanned Air Vehicles (UAVs), and highly-dynamic guided weapons.

Embodiments of the invention include robust, a low cost-size-weight-and-power (c-SWAP) GPS/INS navigation and timing system on-board the air vehicle. Other instruments are also included such as, for example, altimeters, precise frequency sources and clocks, and a low-power transmitter on-board the air vehicle that provides a wireless data link of the TSPI information to the ground. Other on-board components can also include image-based navigation systems. Embodiments enable more versatile and lower cost range instrumentation and flight test capabilities compared to the use of traditional large ground based assets like radar. Embodiments provide a small, robust, rapidly deployable high-performance TSPI system for use on-board air vehicles and components involving low-cost ground networks. Reduction in total operating costs for range tests involving small air vehicles is expected.

Embodiments of the invention offer a new advanced range instrumentation technology (AIST) system for providing precise TSPI. Systems that provide TSPI are used in U.S. Department of Defense (DoD) ranges for developmental testing of new sensor systems, testing the positioning, navigation, and timing (PNT) performance of navigation systems, guidance and targeting systems, usually for aircraft and other airborne systems, such as manned and unmanned air vehicles (UAVs), precision guided munitions, and aerostats. PNT is sometimes also referred to in conjunction with position, velocity, and time (PVT). Embodiments of the invention may also be equally applied to larger, less dynamic aircraft.

Traditional TSPI systems include on-board GPS and GPS/inertial navigation system (INS) and other navigation sensor combinations and ground-based systems such as radar and high precision photometry, such as using cinetheodolites. For on-board systems using GPS often the TSPI or measurement information captured on-board is telemetered to the ground using a wireless data link to provide real-time TSPI for real-time performance evaluation and range safety or flight safety applications involving multiple air vehicles. The TSPI data may also be saved on-board the vehicle and later post processed when the flight test is complete.

Traditional ground-based TSPI systems, including high-performance radar and high-precision photometry systems such as using cinetheodolites, can track air vehicles to provide TSPI solutions independent of on-board navigation systems. However, the traditional systems tend to be large and expensive to maintain and expensive to operate for range testing. Data from on-board systems, for example a GPS/INS/TSPI system on-board an air vehicle, may be combined with data from ground-based systems to provide more robust and precise capabilities. Techniques for fusing data and other approaches for enabling improved on-board TSPI involve the inclusion of other types of sensors and information for navigation and timing such as, for example, geo-referenced imagery database information and images captured by imaging sensors, signals of opportunity, radar, precise frequency sources and clocks and other systems and sensors.

More generally, embodiments of the invention also apply for use as a TSPI truth source for range testing (also known as flight testing) the performance of any platform primary navigation system which uses Global Navigation Satellite Systems (GNSS), which includes GPS and also foreign navigation satellite systems. For embodiments of the invention, the use of "GPS" is equivalent to GNSS. Embodiments of the invention offer an independent truth source that may be compared to the PNT solution being produced by the air vehicle's integrated navigation system for performance testing. The platform navigation system is permanently integrated into the air vehicle, whereas the TSPI truth reference is only used to provide an independent reference for flight testing. The assumption is that the TSPI truth source is more accurate and more robust than the system being tested. Having multiple, independent TSPI sources is often important for range safety applications for improved availability and integrity, in the event one TSPI source is not available, or for cross checking independent sources of information.

Embodiments of the invention offer collaborative signal processing using a network of ground receivers. Some novel aspects are related to the TSPI application. This includes the addition of the mission planning feature at the ground station. Embodied in this approach is the pre-planning deployment of the ground network and also to remotely distribute initialization and configuration data to/from (and between) the air based and ground based network of receivers and transmitters. This includes assigning air vehicle ID numbers and vehicle and ground pseudolite pseudorandom code (PRN) numbers/IDs, nominal flight trajectory information, time synch, TSPI type, signal processing information and data relay control approach. Likewise, the use of multiple data link channels for robustness is included. Examples include using this technique in the presence of RF interference or jamming, when GPS or other signals may not be available or reliable, as well as during automatic interference monitoring and reconfiguration control such as, for example, switching to GPS-denied test operation configuration or to a new wireless data link frequency.

Although embodiments of the invention are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions and parameters associated with embodiments of the invention. This includes definitions, the operating environment, and the designation of certain components included in embodiments of the invention.

TERMS/DEFINITIONS IN THE ART

The phrase "TSPI data" is used throughout. Many different forms of TSPI data exist. Some examples of TSPI data as referred to in embodiments of the invention include, but are not limited to, the kinematical data, or the sensor measurement data from which kinematical data is computed. Examples include GPS and INS sensor measurements data, vehicle position, velocity, acceleration and attitude data as a function of time as measured or computed by the navigation system on-board the air platforms or the emitter geolocation data obtained by tracking the wireless data link. TSPI data usually refers to the position, velocity, acceleration, roll, pitch, and yaw as functions of time. However, for embodiments of the invention, raw sensor measurements can also be relayed to the ground and the TSPI solution can be computed on the ground in a processing station. Other important information not traditionally described as TSPI data includes component health data, and status data of components or the mission.

The phrase "TSPI solutions" is also used throughout. In general, TSPI solutions may be thought of as the processed TSPI data including, but not limited to, kinematical information of the vehicle as a function of time such as, for example, position, velocity, acceleration and attitude information. The TSPI solutions may be computed differently depending on component configurations dictated by field conditions. The TSPI data or TSPI solutions as defined above, generically describe or are used to evaluate the position, navigation, and timing (PNT) performance of on-board navigation systems disclosed herein. Reference character 104 (shown in FIG. 1) is used to depict an onboard-navigation system that provides TSPI data or TSPI solutions.

For range or flight testing applications, the navigation system depicted in character 104 may be an additional component that is deployed on an air platform (reference character 102) during a flight test to provide an independent TSPI reference to assess the performance of other instruments and systems on-board the air platform. However, the navigation system associated with character 104 is typically not deployed in the air platform during operational use. For example, the on-board navigation system which provides TSPI may represent a high performance navigation system that is only deployed during the flight test to assess the performance of another navigation system that is permanently integrated into the air platform for operational use. Embodiments are disclosed where the TSPI solutions are computed in the on-board navigation system 104. Additionally, the system includes a ground-based station 112 (shown in FIG. 1), which may also be used to compute TSPI solutions.

"Precise" GPS satellite ephemeris and clock information is a well-known term within the GPS community. It refers to more timely and accurate satellite ephemeris and satellite clock data than what is available directly from the Global Navigation Satellite Systems Space Vehicles (GNSS SV) broadcast signals. The "precise" data may be obtained via connection with the internet or a global information grid (GIG) (shown as reference character 120). The data may also be obtained via a network connection to a GPS Master Control Station.

When the precise data is available on-board, then more precise TSPI navigation solutions may be computed on-board the air platform as compared to those solutions computed using the ephemeris and clock data in the GNSS broadcast signals. Alternatively, the on-board navigation system 104 can make navigation sensor measurements, relay the measurements down to the ground-based station 112, and the ground-based station can incorporate the precise ephemeris and clock data as part of the TSPI solution.

The term "pseudolite" is used to describe a transmitter that creates local, ground-based GPS-like signals. Hence, the term "pseudolite transmitter" (or similar) is generally used herein and in the figures (FIG. 1, reference character 110) to describe a ground-based transmitter transmitting GPS-like or GPS-alternative signals. The pseudolite functions differently than a traditional wireless communications transmitter used to send wireless messages to a receiver, in that the pseudolite uses navigation signals to send these messages. Thus, a receiver that tracks the pseudolite signals can receive messages, but can also use the pseudolite signals for navigation just like a GPS receiver uses GPS satellite signals for navigation. GPS and pseudolite-based navigation systems may also be designed so that the receivers can track both the signals broadcast from GPS satellites as well as the signals transmitted from the pseudolites and use both sets of signals to compute TSPI solutions, or switch from GPS satellite signals to pseudolite signals for TSPI when GPS signals are not available such as, for example, during range tests involving GPS jamming. While pseudolites are usually ground-based, as with the other discussed components, the pseudolite transmitters 110 may also be located away from land, such as, for example, in sea or littoral regions, without loss of generality. Ground based pseudolites at fixed surveyed locations generally represent the most practical approach for range or flight testing applications.

The phrase "data stripping" refers to a GPS signal processing technique to provide increased processing gain such as, for example, to increase signal sensitivity or jam-resistance. With data stripping, the navigation message data bits are either predicted or provided in advance to the receiver. The receiver adjusts the carrier phase at data bit transition epochs according to the known data bit modulation to extend the coherent integration time interval.

Operating Environment

In the accompanying drawings, like reference numbers indicate like elements. FIG. 1 illustrates a system, depicted as reference character 100, and the operational components for determining time-space-position-information (abbreviated as TSPI), according to some embodiments of the invention. The TSPI determination involves signal transmission, reception and processing. All signals discussed throughout are non-transitory.

Embodiments of the invention generally relate to a system 100 for determining time-space-position-information of an air-based platform. The system 100 includes at least one air-based platform 102. Several types of platforms may be used for the air-based platforms 102 without detracting from the merits or generality of embodiments of the invention. Air-based platforms 102 may be manned, unmanned, or a combination of both, depending on mission or testing environments. Air-based platform options include, but are not limited to, air vehicles, aerostats, and precision guided munitions. Embodiments of the invention are also applicable to rockets and space vehicles.

The air-based platforms have an on-board navigation system, generically shown as reference character 104. A dedicated on-board receiver (abbreviated as "Rec") 104A and a dedicated on-board transmitter (abbreviated as "Xmit") 104B are also included. The dedicated on-board receiver 104A is typically considered to be part of the on-board navigation system 104, whereas the dedicated on-board transmitter 104B is typically not included as part of the on-board navigation system. An inertial navigation system (abbreviated as "INS") 104C is integrated with the dedicated on-board receiver 104B in some embodiments. For ease of illustration, the on-board navigation system 104, dedicated on-board receiver 104A, dedicated on-board transmitter 104B, and the inertial navigation system 104C are depicted together.

The on-board navigation system 104 is configured for computing time-space-position-information (TSPI) and providing a wireless data link 106 between the air-based platform 102 and the ground. The dedicated on-board transmitter 104B and the dedicated on-board receiver 104A are configured for transmitting and receiving electromagnetic wave signals through the wireless data link 106. The on-board receiver 104A is also configured to receive electromagnetic wave signals 118 (consisting of signals broadcast by the GNSS space vehicles (SVs) 116, and also navigation and communication signals broadcast by the ground base pseudolite transmitters 110, also referred to herein as wireless data link signals or communication links) broadcast by the GNSS space vehicles (SV) 116. Separate antennas for receiving the sets of electromagnetic wave signals associated with the wireless data link 106 and the GNSS space vehicles (SV) 118 may be used but are not explicitly shown.

A plurality of ground-based receiver nodes 108 are in communication with the air-based platforms 102 through the wireless data link 106. The plurality of ground-based receiver nodes 108 are configured to obtain geolocation measurements from the transmitted electromagnetic wave signals of the air-based platforms 102 through said wireless data link 106. Geolocation solutions may be computed at the processing site, in this case, at the ground processing station 112. The ground-based receiver nodes 108 make signal spectrum measurements and forward the measurements to the ground processing station 112.

The plurality of ground-based receiver nodes 108 are also configured to receive signals broadcast from the GNSS SV 116 and use this information to compute positioning and time synchronization solutions. For example, the ground-based receiver nodes 106 can use this approach to self survey and self synchronize. Precise location and time synchronization of the ground-based receiver nodes 108 and the ground-based pseudolite transmitter nodes 110 are important for proper operation of the system 100. The signals from the pseudolites need to be synchronized and the pseudolite locations also need to be known in order for the pseudolite system to provide a PNT capability to the air platform.

The system 100 includes a plurality of ground-based pseudolite transmitter nodes 110. The ground-based pseudolite transmitter nodes 110 are configured to communicate with the on-board navigation system 104, and the dedicated on-board receiver 104A through the wireless data link 106. The ground-based pseudolite transmitter nodes 110 are configured to broadcast communication and navigation signals including control commands and navigational messages to the on-board navigation system 104 and the dedicated on-board receiver 104A. In some cases the same pseudolite wireless signals used for navigation can also be used to carry communication information so that separate sets of communication signals and navigation signals are not needed.

The system 100 includes at least one ground-based station 112. The ground-based station 112 is a control, monitoring, and processing station and is in communication with the air-based platforms 102. A ground communication network 114, sometimes referred to as a ground network, is included in the system 100 and is used to transmit and receive data and messages between the ground-based station 112 and the ground-based receiver nodes 108 and ground-based pseudolite transmitter nodes 110. The ground communication network may be implemented using either hardwired or wireless communications links or a combination of both. Thus possible communication links for the ground communication links include, but are not limited to, fiber optic, cable, wire, terrestrial, and non-terrestrial wireless systems, or a combination of these. An example of non-terrestrial wireless systems would include using a satellite. Satellite systems could be used, for example, to connect remote locations that do not have a wireless infrastructure. Thus, as depicted in FIG. 1, the ground-based station 112 communicates with the air-based platforms 102 through the ground communication network 114, to the ground-based receiver nodes 108, and then from the ground-based pseudolite transmitter nodes 110 through the wireless data link 106 to the air-based platforms.

The ground-based receiver nodes 108 and ground-based pseudolite transmitter nodes 110 are depicted in FIG. 1 as being co-located, which is an option. The use of co-located nodes offers some advantages associated with position initialization and time synchronization of the ground-based pseudolite transmitter 110 nodes by the ground-based receiver 108 nodes and simplification of the message and data handling through the network. However, another option is to have the ground-based receiver nodes 108 and ground-based pseudolite transmitter nodes 110 be positioned at different locations (not co-located). The location and positioning is determined by application-specific conditions, such as, for example, the type of test to be performed or the testing environments.

The ground-based station 112 is configured to send control commands to and receive data from the air-based platforms 102, the ground based receiver nodes 108, and the ground-based pseudolite transmitter nodes 110. For example, the commands could be to initialize or reconfigure the ground and air components and the data can include TSPI data as well as status and health data of the various components, including identifying and diagnosing component faults. In the case of remotely correcting a fault, the term "reconfigure" corresponds to a more general corrective action, which can include a reboot, re-initialization, or troubleshooting command for further diagnosis.

The ground-based station 112 is configured to monitor and control the components of the on-board navigation system 104 on-board the air-based platforms 102, the ground-based receiver nodes 108, and the ground-based pseudolite transmitter nodes 110. The ground-based station 112 is configured to control and monitor the health and status of ground based receiver nodes 108, the ground-based pseudolite transmitters 110, and the on-board navigation system 104. Health monitoring can include verifying that the commands of the ground-based receiver nodes 108 are executed properly and verifying that no component faults or malfunctions have occurred. Additionally, since the ground-based station 112 is also a processing station, it is configured to compute TSPI solutions.

Some embodiments of the invention include a plurality of global navigation satellite system space vehicles (GNSS SV) 116 that are configured to provide navigation signals to the air-based platforms 102, the plurality of ground-based receiver nodes 108, the ground-based pseudolite transmitter nodes 110, and the ground-based station 112. The use of GPS allows components to synchronize and also for self-surveying the ground receiver and pseudolite components.

The navigational signals from the GNSS SV 116 are generically shown as being transmitted or broadcast through a wireless downlink signal 118. Receivers would typically process signals from at least four GNSS SV 116 in order to compute a PNT solution. Thus, with the inclusion of GNSS SV 116, several variations of supplying the control commands and navigation messages are relevant, including broadcasting the GNSS SV signal navigation message data bits from the ground-based pseudolite transmitter nodes 110 to the on-board navigation system 104. This can enable a more robust operation of the on-board navigation system receiver 104A in acquiring, tracking and processing the wireless downlink signals 118 broadcast from the GNSS SVs 116. Additionally, the ground-based receiver nodes 108 self-survey and synchronize by tracking GPS/GNSS SV navigation signals through the wireless downlink signal 118 from the GNSS SV 116.

Components designated as "ground-based" in some embodiments are depicted as reference characters 108, 110, 112, 114, and 120. However, without loss of generality, the disclosed system and methods may be implemented to provide TSPI solutions for range testing on land, in the open sea, and in littoral zones. Thus, for example, the "ground-based" receiver nodes 108, the "ground-based" pseudolite transmitter nodes 110 may be deployed on buoys and the "ground-based" station 112 can be located on a sea vehicle for operation in the open sea or littoral zones. Similarly, the global information grid (GIG) 120, included in some embodiments, is a network that exchanges information (communicates) with the ground-based processing station 112 through the ground communication network 114. As with other components, the GIG 120 may be located on land, in the open sea, and in littoral zones.

In some embodiments, the on-board navigation system 104 includes a computer (not shown) that is configured to process TSPI and compute the TSPI solutions of the air-based platform 102. The computation is performed by using the navigation signals from the GNSS SV 116 and the navigation signals from the plurality of ground-based pseudolite transmitter nodes 110. When only the GNSS SV signals are available, for example when the pseudolites are turned off, then the on-board navigation system 104 can compute TSPI solutions using only the navigation signals from the GNSS SVs 116. When only the navigation signals from the plurality of ground-based pseudolite transmitter nodes 110 are available, for example when the GNSS satellite signals are being jammed during range testing, then the on-board navigation system 104 can compute TSPI solutions using only the navigation signals from the plurality of ground-based pseudolite transmitter nodes 110.

The dedicated on-board transmitter 104B in the air-based platforms 102 is a wireless datalink transmitter configured to transmit the TSPI information and monitoring information to the ground-based receiver nodes 108. Additionally, the wireless datalink transmitter signal 106 transmitted by the on-board transmitter 104B to the ground-based receiver nodes, may be a pseudolite type of signal, which is synchronized in time to improve the emitter geolocation operation performed by the ground-based receiver nodes 108 and the ground processing station 112. Synchronized wireless datalink signals 106 transmitted by the on-board transmitter 104B could, for example, allow the use of Time-of-Arrival (TOA) emitter geolocation techniques by the ground components rather than Time-Difference-of-Arrival (TDOA) emitter geolocation techniques.

The dedicated on-board receiver 104A in the air-based platforms 102 is configured to communicate with the computer (not shown) in the on-board navigation system 104. The dedicated on-board receiver 104A is configured to receive the navigation signals information from the GNSS SV and the communication and navigation signals information including control commands and navigational messages from the ground-based pseudolite transmitter nodes 110. The on-board transmitter 104B is configured to receive control information received from the dedicated on-board receiver 104A sent from the ground-based pseudolite transmitter nodes 110 through the wireless datalink signal 106 (or through the on-board computer).

The messages broadcast from the ground-based pseudolite transmitter nodes 110 can include a wealth of information. Some of the information included in the messages includes: 1) precise ephemeris and clock data of the GNSS SVs 116, 2) location and clock data of the ground-based pseudolite transmitter nodes 110, 3) navigation system control information to initialize or reconfigure components of the on-board navigation system 104, 4) GNSS navigation message information configured for assisting data stripping navigation message bits on the navigation signals from the GNSS SVs 116, and 5) GNSS initialization data configured for providing fast acquisition performance. Some of these messages enable a higher performance on-board navigation system 104, including: increased navigation accuracy, increased performance associated with faster acquisition or reacquisition of the GNSS SV 116 signals and higher performance for receiving and tracking GNSS SV signals in the presence of attenuation or RF interference.

In some embodiments, the ground-based station 112 may include a user-in-the-loop, such as a person carrying a small, mobile computing device to control the plurality of ground-based pseudolite transmitter 110 nodes and plurality of ground-based receiver 108 nodes and on-board navigation system 104, monitor the status of these components and display real-time TSPI information of the air-based platforms 102. In some embodiments, the ground-based station includes a computer (not shown) configured to process TSPI solutions of the air-based platforms 102 using the TSPI information received from the on-board navigation system 104 and geolocation measurements received from the ground based receiver nodes 108. The ground-based station 112 receives the TSPI information from the on-board navigation system 104 via the ground-based receiver nodes 108, by way of the ground communication network 114. Similarly, the ground-based station 112 receives the geolocation measurements made by the ground-based receiver nodes 108 through the ground communication network 114.

Theory of Operation

Reference may sometimes be made, in some embodiments, to "system components," or "air-based components," or "ground-based components" in describing embodiments of the invention. While variations can exist, "air-based components" generally refer to the air-based platforms 102 (sometimes referred to as "air vehicles," air-based vehicles," or the like). However, embodiments described herein can also provide TSPI solutions for systems that transition through the atmosphere into space such as launch vehicles, rockets, and platforms that operate in the environment of space, including space vehicles.

Located on or inside the air vehicle is the on-board navigation systems 104, including the dedicated on-board receivers 104A, the dedicated on-board transmitters 104B, and the inertial navigation system (INS) 104C. The GNSS SV 116 can include GPS satellites as well as foreign radio frequency satellite navigation systems, providing navigation signals indicated by the communication links (118) to the air vehicles and the ground. The wireless communication link 106 connects the air-based platform with the ground and includes a wireless link from the ground-based pseudolite transmitter nodes 110 to the dedicated on-board receivers 104A on board the air-based platform 102 and a wireless datalink from the dedicated on-board transmitters 104B to the ground-based receiver nodes 108.

"Ground-based components" generally refer to the ground-based receiver nodes 108, ground-based pseudolite transmitter nodes 110, the ground-based station 112 (sometimes also referred to as a control and monitoring station or ground processing station, or variation thereof), and the ground communication network 114. Additionally, some variations in number and nomenclature of system components may be made without being construed as limiting. Some examples include "ground-based receiver nodes" 108 & "ground-receivers," "ground-based pseudolite transmitter nodes" 110 & "pseudolite transmitters" & simply "pseudolites."

Other radio navigation systems and signals, sensors and instruments not explicitly shown in FIG. 1 may likewise be integrated into the ground-based, air-based, and space-based components such as, for example, to enhance the accuracy or robustness of operation under challenging conditions, such as during range or flight tests involving GPS jamming. These other navigation systems and signals, sensors and instruments can include, but are not limited to: Space-Based Augmentation System (SBAS) signals, LOng RAnge Navigation (LORAN) signals, signals of opportunity, such as signals broadcast from terrestrial radio and TV stations, and signals transmitted from communications satellites, such as the Iridium satellite system, high-stability frequency standards and clocks, altimeters, compass and other types of navigation aiding sensors and instruments.

Taken together, the ground-based receiver nodes 108 may be referred to as a network of self-surveyed ground receivers (or ground receiver network) which are capable of receiving GPS signals (from the GNSS SV 116 via the wireless downlink signal 118) to precisely survey their ground-based locations after deployment. This self-survey capability allows more rapid deployment and operational cost reduction since a manual survey can be avoided. The ground-based receiver nodes 106 also receive the signals transmitted by the air vehicles 102 via the wireless data link 106. Thus, the ground-based receiver nodes (sometimes referred to as a ground receiver network) 108 tracks the GPS signals from satellites (GNSS SV 116) and the transmitted data link signal (via the wireless data link 106). The ground-based receiver nodes 108 make measurements of the wireless data link signal (via the wireless data link 106) to geolocate the air platform 102 using Time of Arrival/Frequency of Arrival (TOA/FOA) or Time Difference of Arrival/Frequency Difference of Arrival (TDOA/FDOA) techniques.

The measurements of the wireless data link 106 signal made by the ground-based receiver nodes 108 are sent to the ground processing station 112 using the ground communication network 114. The actual geolocation solution is computed at the ground processing station 112 using TOA/FOA or TDOA/FDOA techniques. The ground-based receiver nodes 108 also receive the TSPI information from the on-board navigation system 104 transmitted by the on-board transmitter 104B using the wireless data link 106. The TSPI information is also sent to the ground processing station 112 using the ground communication network 114.

Directional antenna systems can also make angle-of-arrival (AOA) measurements from the wireless data link signal (via the wireless data link 106), and AOA measurements made by two geographically displaced systems can allow triangulation to instantaneously geolocate the air vehicle 102. The AOA measurements would be sent to the ground processing station 112 using the ground communication network 114, and the triangulation would normally be performed at the ground processing station 112. Alternatively, the ground processing station 112 can fuse the AOA information with the TOA/FOA or TDOA/FDOA information and TSPI information provided by the on-board navigation system 104 to compute more robust and accurate TSPI solutions of the air-based platform 102. Precise geolocation using AOA techniques generally use large antennas at the GPS L-band radio frequencies (several meters diameter) whereas small omni-directional antennas, which are inexpensive and easy to deploy, can be used for TOA/FOA and TDOA/FDOA techniques.

The transmitted wireless data link signal (via the wireless data link 106) includes messages that contain TSPI information generated on-board by the GPS/INS (104C) navigation system 104, the dedicated on-board receiver 104A TSPI information generated by receiving and processing the pseudolite signals transmitted by the ground-based pseudolite transmitters 110, and possibly data from other sensors. The GPS receiver capability is integrated into the dedicated on-board receiver 104A.

One or more ground-based computers (the ground processing station 112) are networked to the ground-based receivers 108, and perform signal processing to fuse the GPS/INS data, the received pseudolite signal data, and other on-board sensor data with differential GPS corrections or high-precision GPS ephemeris and clock data to arrive at one independent TSPI solution. There are several ways to fuse data to arrive at different variations, depending on the data available and where the fusing is performed. On-board, the received GPS signal data can be fused with the INS data to compute TSPI solutions or the aforementioned data can also be fused on-board with the received pseudolite signal data. On the ground, this same data can be further fused with the emitter geolocation measurement data to produce TSPI solutions. The ground processing station 112 can be a simple solution, such as, for example, a person holding a mobile device, like a personal computer (PC), laptop computer, or the like or a more complicated solution as computers and equipment deployed within man-made structures.

The GPS/INS data can also utilize the GPS broadcast ephemeris and clock data to provide a less accurate solution. The GPS receiver can apply the ephemeris and clock data it receives directly from the GPS satellites (called "broadcast" ephemeris and clock data) but this data will generally be several hours old and, therefore, not as accurate as the near real-time "precise" GPS ephemeris and clock data. The computers, such as those in the ground-based station 112, also apply the emitter TOA/FOA or TDOA/FDOA) geolocation techniques using the signal transmitted through the wireless data link 106 to geolocate the transmitter 104B on the air vehicle 102 to provide another independent TSPI solution. The PC(s) also fuse the aforementioned on-board data with the emitter geolocation (TOA/FOA or TDOA/FDOA) data to arrive at another blended TSPI solution.

Another configuration of embodiments of the invention includes pseudolite transmitters 110 (sometimes simply referred to as pseudolites) at the ground receiver 108 or other locations, and the signals transmitted by these pseudolites can be received by a modified GNSS receiver on the air vehicle 102. The pseudolites can be preferentially located at or near the ground receiver 108 locations so as to have precise GPS coordinates and time available.

The pseudolite signals can provide another independent means of precise TSPI. In this case, the dedicated on-board receiver 104A of the on-board navigation system 104 receives the signals transmitted by a plurality of ground-based pseudolite transmitters 104 to compute TSPI solutions on-board the air platform 102. Or the TSPI information associated with the pseudolite signals can be transmitted to the ground using the wireless data link 106 signal and the TSPI solutions associated with the pseudolite signals can be computed in the ground processing station 112. The TSPI information associated with the pseudolite signals can be fused with other TSPI information in the ground processing station 112, such as the on-board GPS and INS TSPI information and the emitter geolocation information, to generate another alternative and generally more robust and accurate TSPI solution.

Configurations for providing TSPI for multiple air vehicles 102 can use different coded waveforms to isolate or uniquely identify the different air vehicles, or some other method may be applied for isolation or identification of multiple air vehicles, such as placing the vehicle ID numbers in the messages of the wireless data link 106 transmitted by each vehicle. The ground receiver network 108 would be configured to receive the GPS signals and also the wireless data link 106 signals from each of the multiple air vehicles 102. A way to accomplish this includes, for example, having separate tracking channels for each of the wireless data link signals 106, and the ground-based station 112 can be configured to compute multiple TSPI solutions for each of the air vehicles 102. Note that the terms "ground-based station," "ground processing station," and the like are often used interchangeably without detracting from the merits or generality of embodiments of the invention.

The multiple independent TSPI sources of information can also be combined or fused to enable more precise and robust blended TSPI systems. The data fusing may be done on-board or may be done on the ground. The TOA/FOA or TDOA/FDOA emitter geolocation technique using the wireless signal 106 transmitted from the air vehicle 102, would typically be performed on the ground for TSPI applications, and the fusing of the emitter geolocation data with the data measured on-board the air vehicle would also be typically performed on the ground. The wireless data link 106 would be used to transmit the on-board TSPI data to the ground-based receivers 108 and the data would be relayed to the ground-based computers/PC(s) (the ground-based station 112) for data fusing, such that the data from the ground based receivers 108 are sent to the ground processing station 112 through the ground communication network 114.

The ground-based station 112 also fuses the available data to provide blended TSPI solutions. Many algorithms are available for fusing TSPI data, such as for example, variations of real-time Kalman filters. Some algorithms may also be applied in post-processing techniques, to further improve the accuracy of TSPI solutions.

The air-based platform 102 also includes a small, low-power transmitter 104B to transmit the on-board navigation information to a network of ground-based receivers 108 using a wireless data link signal 106. The data link signal 106 may be synchronized to OPS time as computed using the on-board GPS receiver 104A (sometimes referred to as "dedicated on-board receiver" or similar) to provide a precise frequency reference and time synchronized signal source for application of ground based TOA/FOA geolocation of the emitter signal such as, for example, the wireless data link 106 signal transmitted from the on-board transmitter 104B.

When configured to transmit synchronized GPS-like signals, the dedicated on-board transmitter 104B is known as a pseudolite, and the dedicated wireless data link signal 106 signal may be geolocated using TOA/FOA techniques. Alternatively, when the wireless data link signal 106 cannot be synchronized to GPS time such as, for example, in the event GPS is denied when GPS jamming conditions are being tested, then the dedicated on-board transmitter signal may be geolocated using TDOA/FDOA techniques in which the time epoch of signal phase transmissions are not exactly known. The wireless data link signal 106 messages also include the on-board TSPI information to relay to the ground-based receivers 108.

Traditional techniques to geolocate an emitter signal using TDOA/FDOA, in which the signal waveform or signal characteristics or modulation is not known in advance, typically require that the receivers capture the entire frequency spectrum bandwidth associated with the emitter signal waveform. In order to apply the technique of TDOA/FDOA, the emitter signal waveform spectrums as received by two or more remote receivers must be relayed to a common location to apply TDOA/FDOA signal processing. In the case of GPS pseudorandom noise (PRN) code signal waveforms, the spectrum can be several MHz wide, so that multi-bit digitization of the spectrum, which is relayed to a ground processing station at one-second intervals, can require network data rates of several tens of MHz. Ground networks in remote locations may not be able to support data rates this high, especially if wireless links are utilized.

However, in another embodiment of the invention, knowledge of the signal waveform used in the wireless data link 106 transmitted by the dedicated on-board transmitter 104B on the air-based platform 102, can be used in the ground-based receiver nodes 108 to receive the signal to significantly reduce the network data rate requirements. For example, if the dedicated on-board transmitters 104B use a known PRN code type of signal waveform for the wireless data link 106, then the ground-based receiver nodes 108 can use the same PRN code waveform to receive the wireless data link signal. Thus, for example, a matched filter implementation in which the ground-based receiver nodes 108 correlate an internally generated PRN code, identical to the PRN code used by the dedicated on-board transmitter 104B, to track the wireless data link signal 106. While the signal is being tracked, the ground-based receiver nodes 108 can make time-of-arrival (TOA) measurements associated with unique phase epochs of the transmitted waveform or data bits. These TOA measurements made by multiple remote ground-based receiver nodes 108 can be sent to the ground processing station 112 using the ground network. The ground processing station 112 can derive time-difference-of-arrival (TDOA) measurements to use to geolocate the air-based platform 102 by differencing TOA measurements associated with pairs of ground-based receiver nodes 108. Similarly, the ground-based receiver nodes 108 can also make frequency-of-arrival (FOA) measurements by tracking the signal carrier and measuring the received frequency at unique signal epochs, and forward the FOA measurements to the ground processing station 112, where FDOA can be derived by differencing FOA measurements associated with pairs of ground-based receiver nodes 108, to support TDOA/FDOA geolocation signal processing in the ground processing station.

The use of known waveforms to receive the wireless data link signal 106 and measure TOA/FOA as described herein can allow a reduction in the network data rate by a factor of one million or more as compared to traditional TDOA/FDOA techniques, in which the entire spectrum bandwidth of the signal waveform needs to be relayed through the network to the ground processing station 112. In addition, the use of waveforms can offer significant Signal-to-Noise-Ratio (SNR) advantages for weak signals, improving the geolocation measurement accuracy, and allowing the use of lower power in the dedicated on-board transmitter 104B. To apply the technique as described herein, the ground-based receiver nodes 108 are assumed to be synchronized in time and also calibrated in frequency, which is provided through the use of GPS or GNSS SVs 116 to self-survey the ground-based receiver nodes' 108 locations and also synchronize the ground-based receiver nodes' clocks and calibrate the oscillator frequencies. The use of precise oscillators and clocks in the ground-based receiver nodes 108, such as small atomic clocks, allows the ground-based receiver nodes' clocks to remain synchronized and the oscillators to remain calibrated in frequency to suitable precision to support high precision TDOA/FDOA signal processing to geolocate the air based platform 102 for the duration of the flight test, even when OPS is unavailable or denied for the duration of the flight test.

Multiple wireless data link 106 channels provide further robustness such as, for example, in the presence of RF interference, and the system can include automatic interference monitoring and reconfiguration control such as, for example, switching to a new frequency channel in the event interference is detected. In the case of reconfiguration, the dedicated on-board receivers 104A and the ground-based receivers 108 would be controlled to correspondingly switch configurations when the ground-based pseudolite transmitters 110 and dedicated on-board transmitters 104B, respectively, are switched.

The ground-based receiver network 108 receives the GPS satellite signals and also the dedicated on-board transmitter 104B wireless data link signals 106. The data link signals 106 transmitted by the dedicated on-board transmitter 104B and the ground-based pseudolite transmitters 110 can be constructed to be GPS-like so as to cause minimal modification impacts to a traditional GPS receiver, either on-board the air platform or on the ground. Although not specifically differentiated in FIG. 1, the wireless data link 106 applies to both uplink and downlink.

The transmitter signal 106 may use a GPS-like pseudorandom nose (PRN) code, may be pulsed, offset in frequency, as in some existing GPS pseudolite designs, so as to cause minimal interference with the reception of GPS signals. Alternatively, the transmitted signal 106 need not use a GPS-like signal and can use different frequencies and signal characteristics. A flexible dedicated on-board receiver 104A and ground-based receiver 108 construction can be based on Software Defined Radio (SDR) for flexible reconfigurations such as, for example, using a combination of Field Programmable Gate Arrays (FPGAs) for high-speed signal processing functions and PC software for lower-speed signal or data processing functions. The ground-based receivers 108 may include processing the emitter geolocation signal associated with the wireless data link 106 in a tightly-coupled signal processing fashion using the GPS signal for precise timing.

An alternative configuration includes ground-based transmitters 110 that act as GPS satellites, or pseudolites. These ground-based transmitters 110 may be co-located with the GPS ground-based receiver 108 network (sometimes referred to as "nodes") to facilitate synchronization of the pseudolite signals to the GPS time. The pseudolites 110 can provide an independent and more robust navigation capability to aid the navigation system 104 on-board the air platform 102. For example, the pseudolites 110 can provide an independent precise TSPI capability under GPS-denied conditions. The ground-based pseudolites 110 can be configured with precise frequency sources and clocks to maintain precise time synch for testing under GPS-denied conditions.

The ground-based station 112 can include a receiver to receive the network data from the ground-based receivers 108 network, and a computer such as, for example, a personal computer (PC), or workstation, to process the on-board navigation and emitter geolocation data. The ground station 112 may also include a GPS receiver, such as for example, to provide time synchronization information. Without loss of generality, a ground-based transmitter 110 node and/or a ground-based receiver 112 node can be co-located with the ground station 112. In the instance of a wired connection, the PC may be a receiver of digital network data. The ground-based station 112 is also connected to the Internet or Global Information Grid (GIG) 120, to receive near real-time, high precision GPS ephemeris and clock data and other types of data to improve TSPI accuracy, such as ionospheric corrections, to reduce the GPS signal-in-space (SIS) errors and thus improve the accuracy of the GPS navigation solution.

Alternatively, the ground-based receivers 108 network may be configured to measure local differential GPS corrections or GPS errors, and relay the errors or corrections to the dedicated on-board navigation system 104 or the ground-based station 112 to improve the accuracy of the GPS solution. The computer in the dedicated on-board navigation system 104 or the ground-based station 112 combines the precise ephemeris and clock data or differential corrections with the TSPI information generated on-board or transmitted from the air vehicle 102 to the ground receivers 108, respectively to provide extremely precise TSPI solutions. The ground-based station 112 also processes the emitter geolocation data received from the ground-based receivers 108 network which receive the wireless data link 106 signal to provide another independent solution of TSPI solutions. The ground-based station 112 may also fuse/combine the TSPI data transmitted from the air vehicle 102 with the emitter geolocation data to provide a blended set of TSPI solutions.

The ground-based station 112 also acts as a remote controlling and monitoring system for the ground network and the air platform components. For example, the ground-based station 112 can configure the ground-based receiver 108 and ground-based pseudolite transmitter network 110 and the dedicated on-board receiver 104A and dedicated on-board transmitter 104B such as, for example, by controlling the frequencies, waveforms, and other signal characteristics transmitted and received by each of the components. In addition, the ground station 112 receives status information associated with monitoring the ground and on-board components. This monitoring status information can take the form of the health of components or the configuration status, proper component operation or fault information if components are not functioning properly. The ground-based station 112 is configured with a mission planning feature that is useful for pre-planning the deployment of the ground network and also to remotely distribute initialization and configuration data to and from (and between) the air based and ground based network of receivers and transmitter nodes.

This includes assigning air vehicle ID numbers and vehicle and ground pseudolite PRN code numbers/IDs, nominal flight trajectory information, time synch, TSPI type, signal processing, and data relay control approach.

Without loss of generality, the proposed system and method may be implemented to provide TSPI solutions for range testing on land, in the open sea and in littoral zones. For example, the ground-based receiver 108 and ground-based pseudolite transmitter 110 network may be alternatively deployed on buoys and the ground processing station can be located on a sea vehicle for operation in the open sea or littoral zones. In the case that the ground-based receivers and transmitters are not stationary, for example located on buoys, the receiver 108 and pseudolite transmitter 110 nodes continuously maintain survey quality position, velocity, and time synch information for the system to function properly, for example, by the receivers continuously 108 processing GPS satellite signals.

More recent advanced techniques for processing data from multiple receivers may be implemented for improved robustness such as, for example, techniques associated with collaborative signal processing. In this case, receiver measurements may be combined at the raw measurement level such that correlator output measurements made by a plurality of receivers may be processed in a single filter. This implementation performs a blended estimation solution of the Position, Velocity and Time (PVT) states of the air platform 102 and other network nodes.

Figure 2:
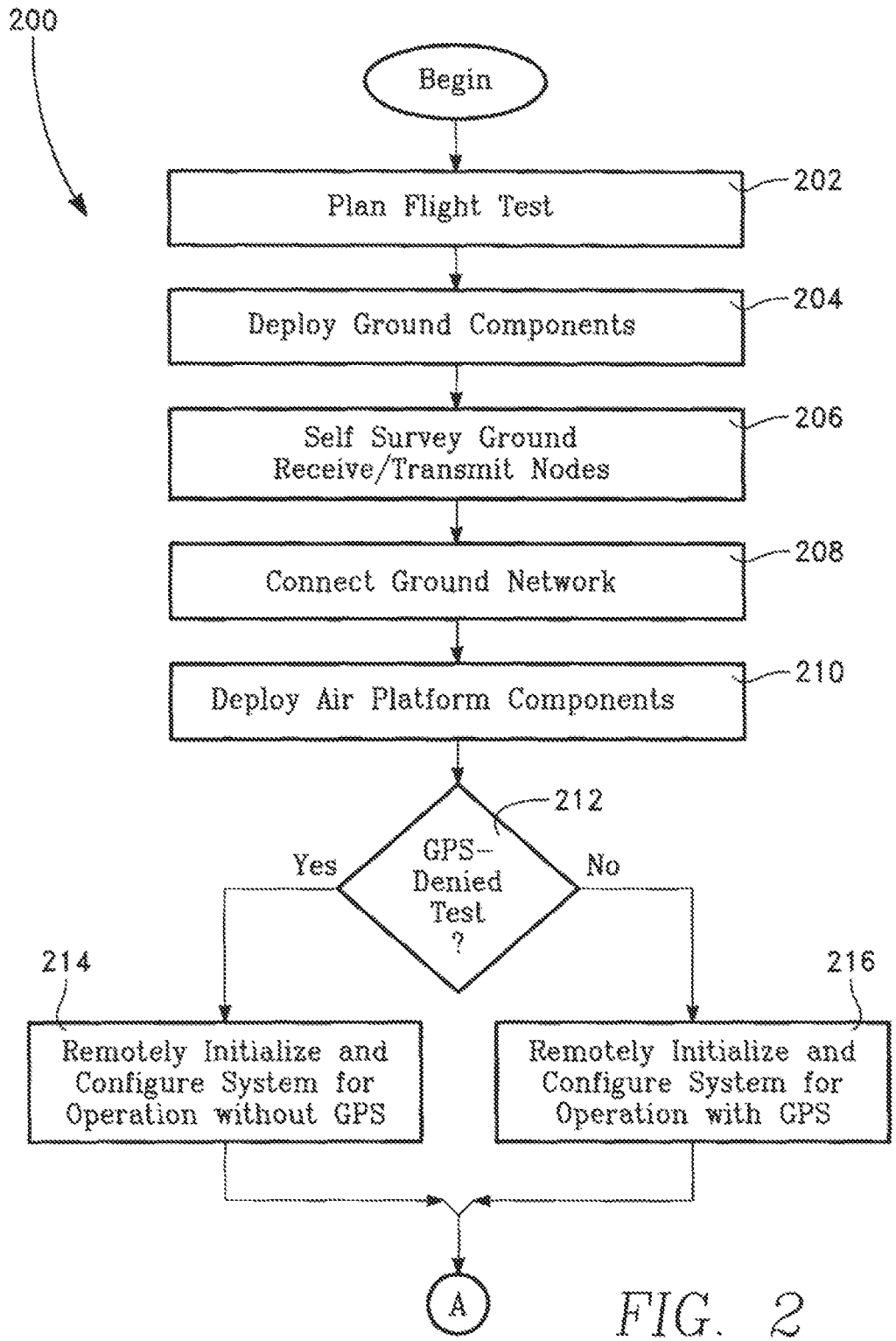
FIG. 2 is an exemplary block process diagram/flowchart of providing time-space-position-information, according to some embodiments of the invention.
Figure 3:
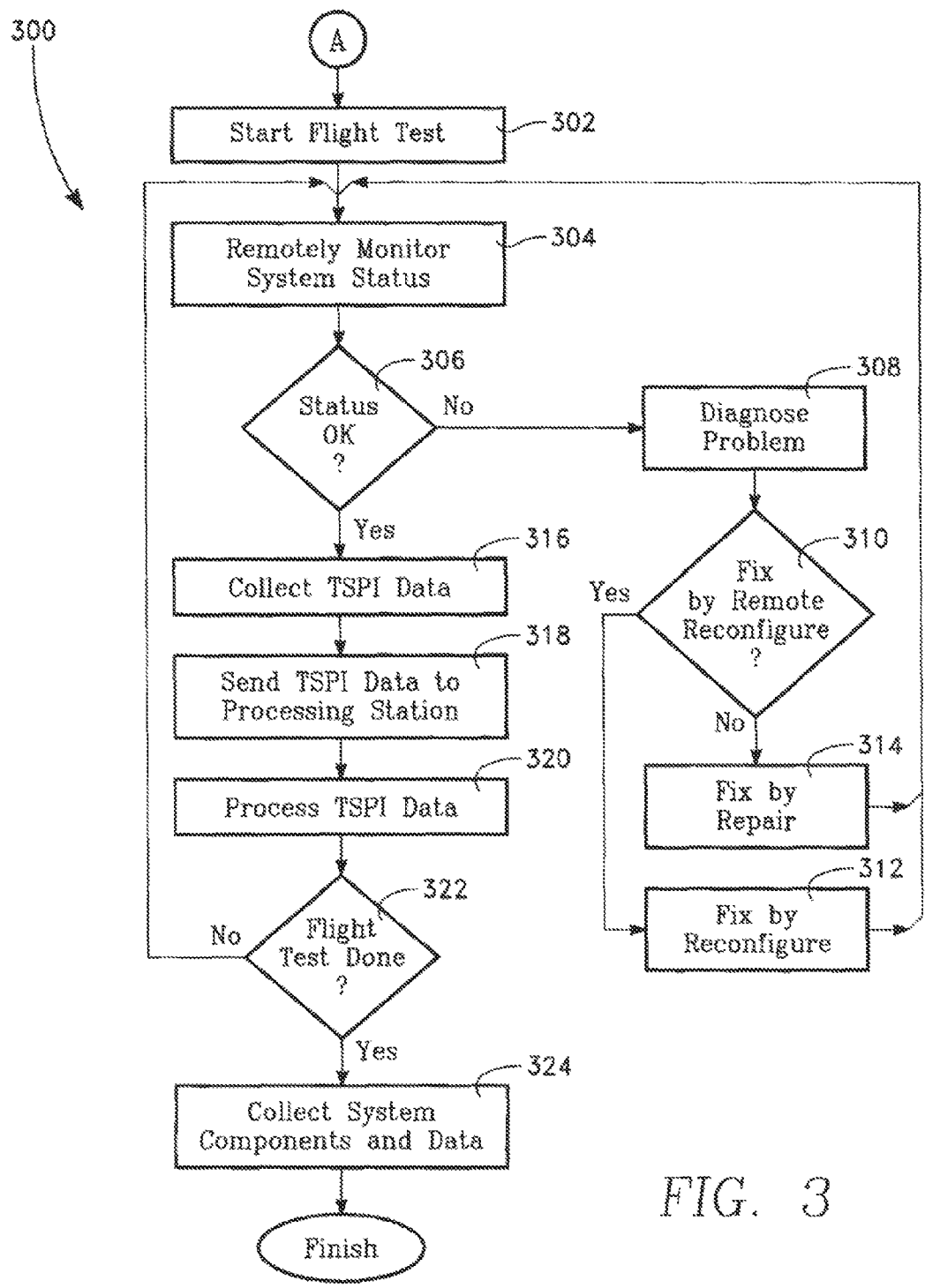
FIG. 3 is an exemplary block process diagram/flowchart of providing time-space-position-information, according to some embodiments of the invention.

FIGS. 2 and 3 are exemplary block process diagrams/flowcharts, according to some embodiments of the invention. Both figures relate to providing time-space-position-information (TSPI) for air-based platforms using a non-transitory computer-readable medium. Both FIGS. 2 and 3 are equally applicable to method and article of manufacture embodiments in conjunction with the system described above and shown on FIG. 1.

Specifically, FIG. 2 depicts the tasks used to plan the deployment and deploy the physical components and initialize the system and components discussed above and shown in FIG. 1 in relation to a flight test. Planning the deployment can address such items as how many components to deploy and where to locate the ground components to enable good coverage and wireless data link availability of the air platforms. The deployment and initialization tasks are depicted as reference character 200.

FIG. 3 depicts the tasks used during the flight test to collect TSPI information, depicted as reference character 300, using the system described and illustrated in FIG. 1. Character 300 in FIG. 3 also includes a final task of collecting the physical components and retrieving the TSPI data. Thus, FIGS. 2 and 3, when taken together, depict the body of tasks performed in using the system disclosed in some embodiments of the invention and illustrated in FIG. 1 for providing TSPI and collecting TSPI information.

Referring to FIGS. 2 and 3 simultaneously, one embodiment of the invention includes providing time-space-position-information for at least one air-based platform. This includes providing a system to collect time-space-position-information (TSPI). The system has at least one air-based component and a plurality of ground-based components. A flight test is planned, which includes planning on how to deploy the ground components, and then the air-based and ground-based components are deployed (Task 202/210). The flight test is then started (Task 302). The air and ground-based components are controlled and monitored remotely from a ground-based station (Task 304).

System health is monitored (Task 306) as an ongoing task. Additionally, a "system test" can be performed after deployment and initialization and prior to the start of the flight test as this allows correction of any faults prior to starting the flight test. Should a problem occur within the system, the problem, such as a fault, is diagnosed (Task 308). A determination (Task 310) is made whether to fix the problem manually (Task 314) such as, for example, manually repairing a physical connection on the ground or to fix the fault by remote command or reconfiguration (task 312) such as, for example, re-booting system components or re-transmitting commands.

TSPI data is continually collected (Task 316) during the course of the flight test. For example, TSPI data may be collected at rates of one-Hertz or higher. In the instance of the ground-based station performing processing, the TSPI data is sent to the ground-based station (Task 318) and subsequently processed (Task 320) and logged. The TSPI data is typically stored for post flight analysis. The processed TSPI data (solutions) is then output and logged. Upon completion of the flight test (determination Task 322), the system components and data are collected (Task 324). For example, the deployable air-based and ground based components can be retrieved for use in subsequent tests. Some components may be more permanently installed and not be collected, such as ground-based networks using hardwired lines.

In yet another embodiment of the invention, a method to obtain time-space-position-information for at least one air-based platform includes providing a system having components to collect time-space-position-information (TSPI). The deployment of the system components is planned (Task 202). The system components are deployed (Tasks 202/210). The ground network is connected (Task 208). The system is initialized (parts of Tasks 202 through 216). A flight test is started (Task 302).

The system then is remotely monitored (Task 304) to determine system diagnostics, which indicates the system health, and faults, if present (Task 306). When it is determined that the system is not functioning properly (the "no" branch of Task 306), the system problem is diagnosed (Task 308) to determine the cause of the fault. The system problem is fixed either by remote command/reconfiguration or manual repair (Tasks 310, 312, 314) and Tasks 304 through 314 are iterated through until the system is functioning properly.

Upon verification that that system is functioning properly, the TSPI data is collected (Task 316) and sent to the processing station (Task 318) to process the data (Task 320). Optionally, the TSPI data solutions may be output at this point, either as iterative output or final output when the flight test is finished.

Additionally, different types of output can be obtained throughout the process such as, for example, system health status output during and after each of Tasks 306 through 314. A determination is performed to ascertain whether the flight test is complete (Task 322). When it is determined that the flight test is not complete, tasks 304 through 322 are iterated through until it is determined that the flight test is complete. Following the completion of the flight test, deployed system components and data are collected (Task 324). Depending on the operational environment, some or all of the system components may be left behind such as, for example, in situations where they may be needed at a later time for a follow-up flight test.

In embodiments, the planning, deployment, and initializing task includes tasks 202 through 216. The flight test is planned and the ground-based components are deployed (Task 202 and 204). The ground-based components are self-surveyed to geolocate each of the ground-based components (Task 206). This self-surveying function can be accomplished, for example, by each ground-based receiver node receiving the GPS satellite signals and computing their position and time information over an extended time interval in order to reduce errors. The ground-based receiver nodes, ground-based pseudolite transmitter nodes, and ground-based station are connected to the ground communication network (Task 208). The air-based components are deployed (Task 210). For example, the on-board navigation system, including the on-board receiver, transmitter and INS components, may represent a stand-alone system components or payload, which is attached to the air vehicle, inserted into a pod on the air vehicle, or physically integrated into the air vehicle. The on-board navigation system would typically be deployed as a temporary component used during the flight test, but may also be permanently integrated on the air vehicle. A determination is made whether the flight test is a GPS-denied test or not (Task 212). When the flight test is not a GPS-denied test, the system is remotely initialized and configured to operate using GPS (Task 216) and when a GPS-denied test occurs, the system is remotely initialized and configured to operate without using GPS (Task 214).

Articles of Manufacture

Article of manufacture embodiments are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk," CD-ROM, RAM, a PROM, an EPROM, a FLASH-EPROM, any other memory chip or cartridge, a file server providing access to the programs via a network transmission line, and a holographic unit Of course, those skilled in the art will recognize that many modifications may be made to this configuration without departing from the scope.

In some system embodiments, the electronic processor is co-located with the processor readable medium. In other system embodiments, the electronic processor is remotely located from the processor readable medium. It is noted that the steps/acts/processes described herein including the figures can be interpreted as representing data structures or sets of instructions for causing the computer readable medium to perform the step/act/process.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the "C#" programming language or an engineering prototyping language such as, for example, MATLAB®. The computer-usable/readable program instructions may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider or any other method known in the art).

Embodiments of the invention are described in part below with reference to flow chart illustrations and/or block diagrams of methods and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified in the flow chart and/or block diagram block or blocks.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified in the flow chart and/or block diagram block or blocks.

In embodiments, the tangible outputs may be shown and/or represented as a visual display screen depiction, hard copy printouts, as well as other media using classification/matching information such as, for example, a computer having computer-readable instructions that is configured to use output from embodiments of the invention. The output may be used in programs using the output such as, for example, in air vehicle sensor performance evaluation tests or range safety applications.

Demonstration Example

To demonstrate the viability of the use of a small Size, Weight and Power (SWAP) transmitter 104B on-board an air vehicle 102 depicted in embodiments of the invention, the expected wireless data link performance is presented assuming a one-Watt on-board transmitter power at a range of 100 miles. The other on-board components including the on-board receiver 104A and INS 104C can also consist of relatively small SWAP. The feature of small SWAP is very important for use of the proposed system on SWAP constrained small air vehicles, such as small Unmanned Air Systems (UAS). The wireless data link 106 performance is computed using the link budget equation and other relationships to calculate predicted bit error rate (BER) as a function of signal-to-noise ratio (SNR) or carrier-to-noise density ratio (C/N), assuming omni-directional transmit and receive antenna near GPS L-band frequencies, and assuming a 100 Hz bit per second (bps) data rate for relaying the TSPI information on-board the air vehicle to the ground-based receivers 108.

The calculation at an assumed range of 100 miles, wireless propagation path loss associated with an unobstructed line-of-sight and no other losses, provides a C/N of about 55 dB-Hz and an Energy per bit to noise ratio (Eb/N) of about 35 dB for a 100 Hz (20 dB) assumed data rate, which indicates that a BER of 1E-6 can be supported with about a 20 dB link margin to spare. The extra link margin is important in order to reliably receive the signal when such effects such as signal fading and multipath are present. Bit error encoding can allow further improvement in the link margin. Assuming precise GPS time synchronization of the ground receivers 108, wideband transmitter signals, and a tight coupling of the transmitter and GPS signals, then the time difference of arrival (TDOA) accuracy should be a nanosecond or better, corresponding approximately to a one-meter geolocation error for good triangulation geometries. Frequency difference of arrival (FDOA) measurements would further contribute to the performance. Emitter geolocation error can be further reduced by averaging over independent samples to reduce the effects of random error, as the air vehicle 102 moves such as, for example, by using a Kalman filter. The link margin performance for ground based pseudolites 110 transmit power of one-Watt, for the signal being transmitted to the on-board receiver 104A, would be comparable. While a one-Watt power consumption enables the use of batteries that may represent a more easily deployable approach in remote areas versus the use of generators to supply ground power, SWAP constraints for the ground-based components may not be as critical as for SWAP constrained air vehicles. Directional antennas on the ground can be used to enhance link margin but cause increased complexity and cost since they are generally larger than omni antennas and have to be pointed towards the air vehicles 102.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method to determine time-space-position-information for at least one air-based platform in a flight test, comprising:
    (a) providing a system having components to collect time-space-position-information (TSPI), said system components, comprising:
        at least one air-based platform having an on-board navigation system, a dedicated on-board transmitter, and a dedicated on-board receiver, wherein said on-board navigation system is configured for computing time-space-position-information (TSPI) and providing a wireless data link between said at least one air-based platform and the ground, wherein said dedicated on-board transmitter and said dedicated on-board receiver are configured for transmitting and receiving signals with navigation information, control commands, and messages through said wireless data link, wherein said at least one air-based platform is selected from the group of air-based platforms consisting of air vehicles, rockets, launch vehicles, aerostats, space vehicles, and precision guided munitions;
        a plurality of ground-based components in communication with said at least one air-based platform;
    (b) initializing said system for a flight test, said initializing task, comprising:
        determining whether said flight test is a GPS-denied test;
            when said flight test is a GPS-denied test, remotely initializing and configuring said system to operate without GPS; and
            when said flight test is not a GPS-denied test, remotely initializing and configuring said system to operate using GPS;
    (c) starting said flight test;
    (d) remotely monitoring said system to determine system diagnostics, said system diagnostics indicating system health;
        when it is determined that said system is not functioning properly, diagnosing system problem;
        fixing system problem by remote reconfiguration or manual repair and iterating through task (d) until said system is functioning properly;
    (e) receiving TSPI data with a plurality of ground-based receiver nodes through a wireless data link signal transmitted from said dedicated on board transmitter on said at least one air-based platform, wherein said dedicated on board transmitter uses a known transmitter signal waveform, wherein said plurality of ground-based receiver nodes match an internally generated signal waveform to said known transmitter signal waveform to measure time of arrival (TOA) and frequency of arrival (FOA);
    (f) collecting said TSPI data when said system is determined to be functioning properly;
    (g) sending TSPI data to a ground processing station;
    (h) processing said TSPI data with said ground processing station and geolocating said on-board transmitter using emitter signal geolocating techniques, said emitter signal geolocating techniques selected from the group of emitter signal geolocating techniques consisting of time of arrival (TOA), frequency of arrival (FOA), time difference of arrival (TDOA), and frequency difference of arrival (FDOA);
    (i) determining whether said flight test is complete;

when it is determined that said flight test is not complete, iterating through tasks (d) through (i), until it is determined that said flight test is complete;
(j) collecting said system components and said TSPI data; and
(k) outputting said TSPI data in a tangible medium.

2. The method according to claim 1,
said plurality of ground-based components, further comprising:
  said plurality of ground-based receiver nodes in communication with said at least one air-based platform through said wireless data link, said plurality of ground-based receiver nodes configured to obtain geolocation measurements of said at least one air-based platform; and
  a plurality of ground-based pseudolite transmitter nodes in communication with said on-board navigation system, and said dedicated on-board receiver through said wireless data link, wherein each of said plurality of ground-based pseudolite transmitter nodes are configured to broadcast communication and navigation signals including navigation information, control commands, and messages to each of said on-board navigation system, said dedicated on-board transmitter, and said dedicated on-board receiver.

3. The method according to claim 2, wherein said plurality of ground-based receiver nodes receive said wireless data link signal using said known transmitter signal waveform to measure time of arrival (TOA) and frequency of arrival (FOA) measurements for geolocation of said at least one air-based platform.

4. The method according to claim 2, wherein said ground processing station, comprising:
  a ground-based computer configured to process TSPI solutions of said at least one air-based platform using TSPI information received from said on-board navigation system and geolocation measurements received from said plurality of ground-based receiver nodes;
  wherein said ground processing station is configured to receive said TSPI information from said onboard navigation system, from said plurality of ground-based receiver nodes, and through a ground communication network;
  wherein said ground processing station is configured to receive said geolocation measurements made by said plurality of ground-based receiver nodes through said ground communication network;
  wherein said ground processing station is a control and monitor station in communication with said at least one air-based platform through said wireless data link, wherein said ground processing station is in communication with each of said plurality of ground-based receiver nodes and each of said plurality of ground-based pseudolite transmitter nodes through a ground communication network;
  wherein said ground processing station is configured to send commands to and receive data from said at least one air-based platform, each of said plurality of ground-based receiver nodes, and each of said plurality of ground-based pseudolite transmitter nodes; and
  wherein said ground processing station is configured to control and monitor the health and status of said at least one air-based platform, said plurality of ground-based receiver nodes, said plurality of ground-based pseudolite transmitter nodes, and said on-board navigation system.

5. The method according to claim 4, wherein said ground processing station is configured to receive said time-of-arrival (TOA), frequency-of-arrival (FOA), and geolocation measurements information associated with said wireless data link signal from said plurality of ground-based receiver nodes and utilize said time of arrival (TOA), frequency-of-arrival (FOA), and geolocation measurements for geolocation of said at least one air-based platform.

6. The method according to claim 4, wherein said ground processing station computes TSPI solutions by fusing TSPI information received from said at least one air-based platform with TSPI information associated with said time-of-arrival (TOA) and frequency-of-arrival (FOA) geolocation measurements of said wireless data link signal received by said plurality of ground-based receiver nodes.

7. The method according to claim 4, wherein said initializing task, comprising:
  planning said flight test associated with deploying said plurality of ground-based components based on the flight test planning;
  self-surveying said plurality of ground-based components to geolocate each of said plurality of ground-based components;
  connecting said plurality of ground-based receiver nodes, said plurality of ground-based pseudolite transmitter nodes, and said ground processing station, to said ground communication network;
  deploying said plurality of ground-based components; and
  deploying said at least one air-based platform.

8. The method according to claim 7, further comprising:
  a plurality of global navigation satellite system space vehicles (GNSS SV) configured to provide navigation signals to said at least one air-based platform, said plurality of ground-based receiver nodes, said plurality of ground-based pseudolite transmitter nodes, and said ground processing station;
  utilizing said navigation signals received from said GNSS SV by said plurality of ground-based receiver nodes and said plurality of ground-based components to self-survey, geolocate, and synchronize each of said plurality of ground-based receiver nodes and said plurality of ground-based components; and
  a global information grid (GIG) in communication with said ground processing station.

9. The method according to claim 8, said on-board navigation system, further comprising:
  a computer on-board said at least one air-based platform configured to process said TSPI information and compute said TSPI solutions of said at least one air-based platform using said navigation signals from said GNSS SV and said navigation signals from said plurality of ground-based pseudolite transmitter nodes;
  wherein said dedicated on-board transmitter in said at least one air-based platform is a wireless data link transmitter configured to transmit said TSPI information and monitoring information to said plurality of ground-based receiver nodes; and
  wherein said dedicated on-board receiver in said at least one air-based platform is configured to communicate with said computer, wherein said dedicated on-board receiver is configured to receive said navigation signals information from said GNSS SV and said communication and navigation signals information including control commands and navigational messages from said plurality of ground-based pseudolite transmitter nodes;
  an inertial navigation system integrated with said dedicated on-board receiver; and wherein said navigational messages broadcast from said plurality of ground-based pseudolite transmitter nodes, further comprising precise ephemeris and clock data of said GNSS SV, location and clock data of said plurality of ground-based pseudolite transmitter nodes, navigation system control information for said on-board navigation system, GNSS SV navigation message information configured for assisting data stripping navigation message bits on said navigation signals from said GNSS SV, and GNSS SV initialization data configured for providing fast acquisition performance.

10. A non-transitory computer-readable medium in a ground-based station having stored thereon a plurality of computer executable instructions for determining time-space-position-information (TSPI) for at least one air-based platform in a GPS-denied environment, that when executed by a computer, causes the computer to:

remotely control and monitor a TSPI collection system from a control and monitoring station, wherein said TSPI collection system has at least one air-based component and a plurality of ground-based components, wherein said at least one air-based component and said plurality of ground-based components are deployed based on a planned flight test, said at least one air-based component, comprising:

at least one air-based platform having an on-board navigation system including a dedicated on-board transmitter, and a dedicated on-board receiver, wherein said on-board navigation system is configured for computing time-space-position-information (TSPI) and providing a wireless data link between said air-based platform and the ground, wherein said dedicated on-board transmitter and said dedicated on-board receiver are configured for transmitting and receiving signals with navigation information, control commands, and messages through said wireless data link;

geolocate said on-board transmitter using emitter signal geolocating techniques;

reconfigure said air and ground-based components when a configuration fault has been diagnosed;

continue to monitor and control said air and ground-based components until said flight test is complete; and collect said time-space-position-information for said air-based components when said flight test is complete.

11. The non-transitory computer-readable medium according to claim 10, wherein said at least one air-based platform is selected from the group of air-based platforms consisting of air vehicles, rockets, launch vehicles, aerostats, space vehicles, and precision guided munitions.

12. The non-transitory computer-readable medium according to claim 11, said plurality of ground-based components, further comprising:

a plurality of ground based receiver nodes in communication with said at least one air-based platform through said wireless data link, said plurality of ground based receiver nodes configured to obtain geolocation measurements of said at least one air-based platform;

a plurality of ground-based pseudolite transmitter nodes in communication with said on-board navigation system, and said dedicated on-board receiver through said wireless data link, wherein each of said plurality of ground-based pseudolite transmitter nodes are configured to broadcast communication and navigation signals including navigation information, control commands, and messages to each of said on-board navigation system, and said dedicated on-board receiver;

wherein said control and monitoring station is at least one ground-based station, wherein said ground-based station is a control, monitoring, and processing station is in communication with said at least one air-based platform through said wireless data link, said at least one ground-based station in communication with each of said plurality of ground based receiver nodes and each of said plurality of ground based pseudolite transmitter nodes through a ground communication network;

wherein said at least one ground-based station is configured to send commands to and receive data from said at least one air-based platform, each of said plurality of ground based receiver nodes, and each of said plurality of ground based pseudolite transmitter nodes;

wherein said at least one ground-based station is configured to control and monitor the health and status of said plurality of ground based receiver nodes, said plurality of ground-based pseudolite transmitter nodes, said at least one air-based platform, and said on-board navigation system; and wherein said at least one ground-based station is configured to compute TSPI solutions.

13. The non-transitory computer readable medium according to claim 12, further comprising:

a plurality of global navigation satellite system space vehicles (GNSS SV) configured to provide navigation signals to said at least one air-based platform, said plurality of ground-based receiver nodes, said plurality of ground-based pseudolite transmitter nodes, and said at least one ground-based station; and a global information grid (GIG) in communication with said at least one ground-based station.

14. The non-transitory computer-readable medium according to claim 13, said on-board navigation system, further comprising:

a computer on said at least one air-based platform configured to process said TSPI and compute said TSPI solutions of said at least one air-based platform using said navigation signals from said GNSS SV and said navigation signals from said plurality of ground-based pseudolite transmitter nodes;

wherein said dedicated on-board transmitter in said at least one air-based platform is a wireless data link transmitter configured to transmit said TSPI information and monitoring information to said plurality of ground based receiver nodes;

wherein said dedicated on-board receiver in said at least one air-based platform is configured to communicate with said computer on said at least one air-based platform, wherein said dedicated on-board receiver is configured to receive said navigation signals information from said GNSS SV and said communication and navigation signals information including navigation information, control commands, and messages from said plurality of ground-based pseudolite transmitter nodes; and an inertial navigation system integrated with said dedicated on-board receiver.

15. The non-transitory computer-readable medium according to claim 14, said navigational messages broadcast from said plurality of ground-based pseudolite transmitter nodes, further comprising precise ephemeris and clock data of said GNSS SV, location and clock data of said plurality of ground-based pseudolite transmitter nodes, navigation system control information for said on-board navigation system, GNSS navigation message information configured for assisting data stripping navigation message bits on said navigation signals from said GNSS SV, and GNSS initialization data configured for providing fast acquisition performance.

16. A non-transitory computer-readable medium in a ground-based station having stored thereon a plurality of computer executable instructions for determining time-space-position-information (TSPI) for at least one air-based platform, that when executed by a computer, causes the computer to:
(a) perform initialization tasks for a system having components configured to collect time-space-position-information (TSPI) from a flight test, said system components, comprising:
at least one air-based platform having an on-board navigation system, a dedicated on-board transmitter, and a dedicated on-board receiver, wherein said on-board navigation system is configured for computing time-space-position-information (TSPI) and providing a wireless data link between said air-based platform and the ground, wherein said dedicated on-board transmitter and said dedicated on-board receiver are configured for transmitting and receiving signals with navigation information, control commands, and messages through said wireless data link, wherein said at least one air-based platform is selected from the group of air-based platforms consisting of air vehicles, rockets, launch vehicles, aerostats, space vehicles, and precision guided munitions, wherein said at least one air-based platform is deployed;
a plurality of ground-based components in communication with said at least one air-based platform, wherein said plurality of ground-based components are deployed based on flight test planning by a system user, wherein said plurality of ground-based components are self-surveyed to geolocate each of said plurality of ground-based components:
said initialization tasks, comprising:
determining whether said flight test is a GPS-denied test;
when said flight test is a GPS-denied test, remotely initialize and configure said system to operate without GPS; and
when said flight test is not a GPS-denied test, remotely initialize and configure said system to operate using GPS;
(b) remotely monitor said system to determine system diagnostics, said system diagnostics indicating system health;
when it is determined that said system is not functioning properly, diagnosing a system problem;
fix said system problem by remote reconfiguration or when said system problem cannot be fixed by remote reconfiguration, alert a processing station that manual repair is required, and iterate through task (b) until said system is functioning properly;
(c) collect TSPI data when said system is determined to be functioning properly;
(d) send said TSPI data to said processing station;
(e) process said TSPI data and geolocate said on-board transmitter using emitter signal geolocating techniques, said emitter signal geolocating techniques selected from time of arrival (TOA), frequency of arrival (FOA), time difference of arrival (TDOA), and frequency difference of arrival (FDOA);
(f) determine whether said flight test is complete;
when it is determined that said flight test is not complete, iterate through tasks (b) through (f), until it is determined that said flight test is complete;
(g) collect said system components and said TSPI data; and
(h) output said TSPI data in a tangible medium.

17. The non-transitory computer-readable medium according to claim 16,
said plurality of ground based components, further comprising:
a plurality of ground based receiver nodes in communication with said at least one air-based platform through said wireless data link, said plurality of ground based receiver nodes configured to obtain geolocation measurements of said at least one air-based platform;
a plurality of ground-based pseudolite transmitter nodes in communication with said on-board navigation system, and said dedicated on-board receiver through said wireless data link, wherein each of said plurality of ground-based pseudolite transmitter nodes are configured to broadcast communication and navigation signals including navigation information, control commands, and messages to each of said on-board navigation system, said dedicated on-board transmitter, and said dedicated on-board receiver;
wherein said control and monitoring station is at least one ground-based station, wherein said ground-based station is a control, monitoring, and processing station is in communication with said at least one air-based platform through said wireless data link, said at least one ground-based station is in communication with each of said plurality of ground based receiver nodes and each of said plurality of ground based pseudolite transmitter nodes through a ground communication network;
wherein said plurality of ground-based receiver nodes, said plurality of ground-based pseudolite transmitter nodes, and said at least one ground-based station are connected to said ground communication network;
wherein said at least one ground-based station is configured to send commands to and receive data from said at least one air-based platform, each of said plurality of ground based receiver nodes, and each of said plurality of ground based pseudolite transmitter nodes;
wherein said at least one ground-based station is configured to control and monitor the health and status of said at least one air-based platform, said plurality of ground-based receiver nodes, said plurality of ground-based pseudolite transmitter nodes, and said on-board navigation system; and
wherein said at least one ground-based station is configured to compute TSPI solutions.

18. The non-transitory computer-readable medium according to claim 17, said system components further comprising:
a plurality of global navigation satellite system space vehicles (GNSS SV) configured to provide navigation signals to said at least one air-based platform, said plurality of ground-based receiver nodes, said plurality of ground-based pseudolite transmitter nodes, and said at least one ground-based station; and
a global information grid (GIG) in communication with said at least one ground-based station.

19. The non-transitory medium according to claim 18, said on-board navigation system, further comprising:
a computer configured to process said TSPI and compute said TSPI solutions of said at least one air-based platform using said navigation signals from said GNSS SV and said navigation signals from said plurality of ground-based pseudolite transmitter nodes;

wherein said dedicated on-board transmitter in said at least one air-based platform is a wireless data link transmitter configured to transmit said TSPI information and monitoring information to said plurality of ground based receiver nodes;

wherein said dedicated on-board receiver in said at least one air-based platform is configured to communicate with said computer, wherein said dedicated on-board receiver is configured to receive said navigation signals information from said GNSS SV and said communication and navigation signals information including control commands and navigational messages from said plurality of ground-based pseudolite transmitter nodes;

an inertial navigation system integrated with said dedicated on-board receiver; and wherein said navigational messages broadcast from said plurality of ground-based pseudolite transmitter nodes, further comprising precise ephemeris and clock data of said GNSS SV, location and clock data of said plurality of ground-based pseudolite transmitter nodes, navigation system control information for said on-board navigation system, GNSS navigation message information configured for assisting data stripping navigation message bits on said navigation signals from said GNSS SV, and GNSS initialization data configured for providing fast acquisition performance.

* * * * *